Patented Aug. 24, 1954

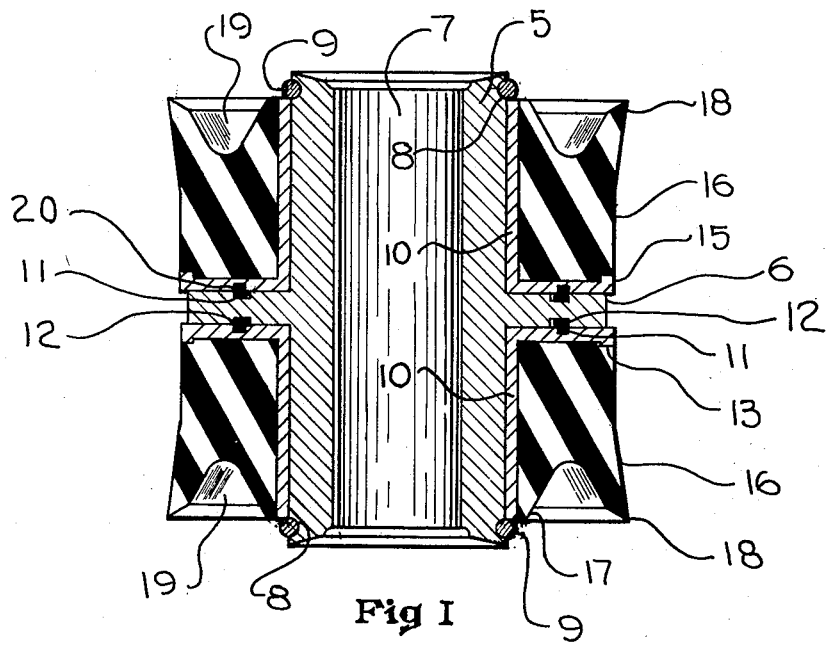
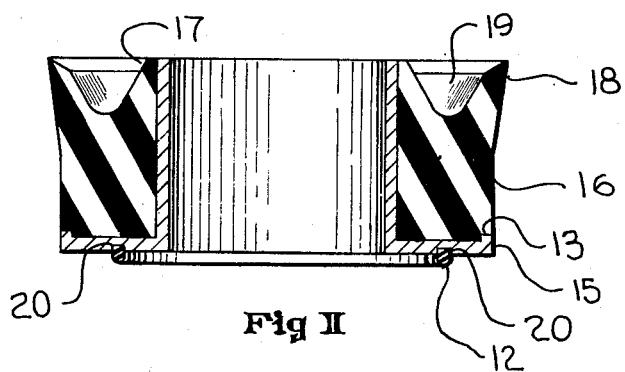
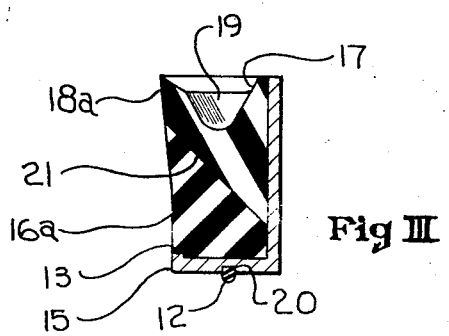

2,687,335

UNITED STATES PATENT OFFICE 2,687,335

PISTON

Hulie E. Bowerman, Grand Prairie, Tex.

Application March 15, 1950, Serial No. 149,869

7 Claims. (Cl. 309—4)

This invention relates to slush pump pistons and more particularly to sealing members therefor which are supported by a flanged sleeve which is adapted to be received by the piston.

A novel feature of the invention provides a fluid seal between the piston and the flanged sleeve of the sealing member.

In conventional pistons the seals consist of a rubber-like circular cup-shaped member adapted to be installed as an oversert to the piston body. The rubber distorts under pressure and moves downwardly on the piston as it is moved by pressure on its face and friction on the cylinder liner into a tightly compressed mass which causes the base of the seal to flow outwardly against the liner and be pinched or sheared off by the piston as it moves along the face of the liner. Upon the return stroke the rubber does not freely slide along the piston to its original position while the friction of the liner exerts a rolling like movement upwardly of the rubber at its outside which causes a scouring like contact with the liner and further excessive wearing away at the base of the rubber. As the base of the seal is thus worn away the succeeding impulse distorts the seal downwardly to fill the space between the piston and the cylinder, which pressure into the cup of the seal causes the lips of the seal to travel or distort inwardly with a rolling like motion away from both the piston body and the cylinder liner, whereupon detritus carried by the fluid enters the spaces and when the pressure is relieved from the cup as the stroke is completed the detritus is entrapped by the seal and dragged back across the face of the liner wearing, scoring, and destroying it at a high rate of speed.

In my novel piston the rubber sealing member is bonded to both the vertical and flanged portions of the sleeve which secures the base of the rubber at the flange against undue outward expansion and retracts it from the liner when pressures against the cup are relieved. Also the rubber bonded to the sleeve will not travel relative thereto under pressure which places the cup portion of the rubber under tension when pressure and friction distort its sealing lip outwardly against the liner to maintain a perfect seal therewith, thus preventing any of the detritus entering between the seal and the liner of the cylinder. This tension in the body of cup returns the lip portion to normal position away from the liner when the pressure on the face or cup portion of the sealing member is relieved. These novel features add greatly to the efficiency and life of my sealing members and to the cylinder liners.

My piston is shown in a double ended form as comprised of a cylindrical central section, suitably apertured to receive a piston rod and with a centrally disposed and outwardly projecting disk-like section adapted to support a sealing member on each of its faces.

The invention will be readily understood and its further novel features will appear in the following description together with the accompanying drawings in which:

Fig. I is an elevation in section of a pair of sealing members assembled on a piston.

Fig. II is a section of a sealing member disassembled from the piston.

Fig. III is a section of modified form of my sealing member.

In the several views like references indicate similar parts, wherein 5 is a piston having a web member 6 projecting radially from its midsection toward the cylinder liner, not shown, and a centrally disposed aperture 7 for receiving a conventional piston rod. A groove 8 is provided about the ends of piston 5 for operably receiving a snap ring 9 whereby sealing member sleeve 10 is secured to the piston when assembled thereon. The web member 6 of the piston is provided with a groove 11 for operatively receiving seal ring 12 which in a preferred form is vulcanized, or in some other suitable manner, bonded to the under side of flanged portion 15 of the sleeve 10. The flanged portion 15 of the sleeve may be provided with an upturned portion 13 which provides a thicker section for wear against the liner and also a protective support for restraining the tendency to flow outwardly by the rubber sealing member 16 when the latter is under compression by the load thrust.

The sealing member 16 is bonded to sleeve 10 and flanged support 15. An inner lip portion 17 of member 16 extends upwardly of and is bonded to the sleeve 10 and a sealing lip portion 18 extends outwardly for sealing engagement with the cylinder liner. A cup or well portion 19 is formed in the rubber member 16 between the lips for receiving the thrust load of fluid being pumped or expelled from the cylinder when the rod is actuated, or the thrust of an impelling medium is applied against the cup whereby the rod is to be actuated.

It is to be noted that the diameter of the cup at lip 18 is greater than at its body and base portion at its juncture with flange 15 and that the diameter of flange 15 is greater than web 6 of piston 5. The flange 15 is formed of a soft metal, such as brass and protects the liner from wear by the harder metal of the web 6 of the piston. Moreover this protective flange is renewed with each renewal of the sealing member.

The operation is as follows:

Piston 5 having been formed with snap ring grooves 8 and seal receiving groove 11, natural or synthetic rubber of the desired hardness is then vulcanized or bonded in some other effective manner to sleeve 6 and flanged base 13—15 and seal ring 12 is likewise bonded to the opposite or under side of flange 15. A groove 20 may be formed in flange 15 for receiving a portion of seal ring 12 and thereby more securely retaining the latter and providing a mating support therefor with groove 11 of web 6 of the piston. Both seal ring 12 and rubber 16 may be vulcanized to the sleeve and flange in the same operation using similar material. The sleeve, with the rubber cup 16 and seal ring 12, is now passed over the end of piston 5 and the seal ring 12 is received by groove 11 of web 6 and snap ring 9 is installed in groove 8 of the piston compressing the sleeve downwardly so that flange 15 seats on web 6 and operatively compresses seal ring 12 in groove 11. Seal ring 12 preferably does not completely fill groove 11, but contacts with its outer surface. The heavier the thrust on the face of the seal cup the more secure seal ring 12 is held in its seat and the opening between flange 15 and web 6 which it is called upon to seal becomes relatively smaller.

Normally lip 18 of the sealing member extends outwardly and is slightly compressed by the liner whereby initial sealing contact therebetween is effected. When the thrust load occurs in the cup portion 19 lip 17 will be compressed inwardly against sleeve 10 and lip 18 outwardly against the liner. This pressure being equal in all directions tends to retain the seal and increase it as the pressure increases. As the thrust progresses cup 19 will compress downwardly and progressively fill the space between the body of cup member 16 and the liner until finally restrained by flange 15 of sleeve 10. Upon completion of the stroke and relief of the pressure the piston reverses direction in the cylinder and the natural tendency of the rubber to resume its normal position will be instantly and continuously accentuated by the fact that portions thereof being bonded to sleeve 10 and flange 15, the strain has placed and retained other portions along the axis of the rubber seal under tension equal to its strain, which action minimizes the drag or friction contact of the rubber with the liner and effectively draws the sealing body back into normal dormant position.

As shown in Figure III, I may provide a sealing member having base rubber 16a of relatively hard material and an upper portion of softer material comprising the sealing lip 18a, the two being bonded together as along line 21. Both rubbers being bonded to sleeve 10 and the harder or base portion to flange 15 thus forming an homogeneous mass. This novel arrangement provides a structure, the base of which resists higher pressures before distortion outwardly to contact with the liner than are resisted by the softer material of the upper portion of the cup and the sealing lip 18a. Thus when the initial light thrust occurs on the face of the piston and in the cup, the soft rubber of the lip 18a perfects initial sealing engagement with the liner and as the pressure increases, transmits it downwardly to the harder or base portion 16a, which being of thinner section near line 21, will distort outwardly to contact with the liner and progressively distort downwardly toward its base as pressures increase until finally it seals the opening between flange 13—15 and the liner. Upon release of pressure against the face of the piston and when the body thereof is on the reverse stroke, the body is progressively withdrawn from contact with the liner from its base upwardly toward the sealing lip.

While in the drawings sealing lips 18 and 18a have been shown as projecting equally from flange 12 as does lip 17 it is to be understood that such positions are relative and may be varied or even reversed as the pressures to be encountered vary and the hardness of the rubber seals are accordingly varied, and that the relative hardnesses, proportions, and shapes of the sections of rubber as shown in Fig. III may be varied as operating pressures, speed of travel of the piston, and other operational factors vary.

What I claim is:

1. As a new article of manufacture a piston seal member comprising a metal sleeve with a flanged base having an annular sealing member of rubber bonded thereto the end of the sealing member opposite said flanged base having an annular recess forming inner and outer annular concentric lips and said inner lip being bonded to the adjacent end of said sleeve and terminating substantially opposite the end of the outer lip and a sealing ring of rubber bonded to the opposite side of the flange from said sealing member.

2. As an article of manufacture a piston seal member comprising a metal sleeve with a flanged base, a sealing member of resilient material bonded to the sleeve and one side of the base the end of the sealing member opposite said flanged base having an annular recess forming inner and outer annular concentric lips and said inner lip being bonded to the adjacent end of said sleeve and terminating substantially opposite the end of the outer lip, a groove in the opposite side of the base, and a seal ring of resilient material partially embedded in and carried by the groove.

3. A piston comprising a cylindrical metal hub having a medially disposed radial web, a groove in said web, a metal sleeve having a flanged base, a rubber sealing member bonded to the sleeve and base the end of the sealing member opposite said flanged base having an annular recess forming inner and outer annular concentric lips and said inner lip being bonded to the adjacent end of said sleeve and terminating substantially opposite the end of the outer lip, a seal ring carried by the base and extending into the groove and means securing the sleeve operably on the hub.

4. A piston comprising a cylindrical metal hub having a medially disposed radial web, a groove in said web, a metal sleeve having a flanged base, a resilient rubber sealing member bonded to the sleeve and base the end of the sealing member opposite said flanged base having an annular recess forming inner and outer annular concentric lips and said inner lip being bonded to the adjacent end of said sleeve and terminating substantially opposite the end of the outer lip, a seal ring carried by the base and extending into the groove and means securing the sleeve operably on the hub, the sealing rubber member being composed of a hard base section and a softer upper section.

5. A piston comprising a cylindrical metal hub having an outwardly disposed radial web, an annular groove in said web, a metal sleeve having a flanged base, a resilient rubber sealing cup bonded to the sleeve and base, an annular seal ring carried by the base and extending into the groove and means securing the sleeve operably on the hub said groove being wider than the width of said ring and being shallower than the depth thereof.

6. As an article of manufacture a piston seal member for use in a cylinder comprising a metal sleeve with a flanged base; a resilient rubber sealing member bonded to said sleeve and at one end to said base, the outer end of said member having an annular recess forming an annular cup having inner and outer concentric lips said inner lip being bonded to the adjacent end of said sleeve and terminating substantially opposite the end of the outer lip, and the rubber near the base being harder than the rubber near the cup end and changing hardness along a conical surface extending from the sleeve near the base outwardly toward the cup end.

7. As a new article of manufacture a piston seal member comprising a metal sleeve with a flanged base having an annular sealing member of rubber bonded thereto, the end of the sealing member opposite said flanged base having an annular recess forming inner and outer annular concentric lips, and said inner lip being bonded to the adjacent end of said sleeve and terminating substantially opposite the end of the outer lip.

References Cited in the file of this patent

UNITED STATES PATENTS

| Number | Name | Date |
| --- | --- | --- |
| 1,612,038 | Miller | Dec. 28, 1926 |
| 1,844,236 | Armentrout | Feb. 9, 1932 |
| 2,081,040 | King | May 18, 1937 |
| 2,211,454 | Failing et al. | Aug. 13, 1940 |
| 2,211,455 | Caldwell | Aug. 13, 1940 |
| 2,216,291 | Caldwell | Oct. 1, 1940 |
| 2,306,838 | Volpin | Dec. 29, 1942 |
| 2,443,110 | MacClatchie | June 8, 1948 |
| 2,576,025 | MacClatchie | Nov. 20, 1951 |